June 8, 1926.
W. J. BARR
1,588,000
AUTOMOBILE TRUCK BODY CONSTRUCTION
Filed March 28, 1924
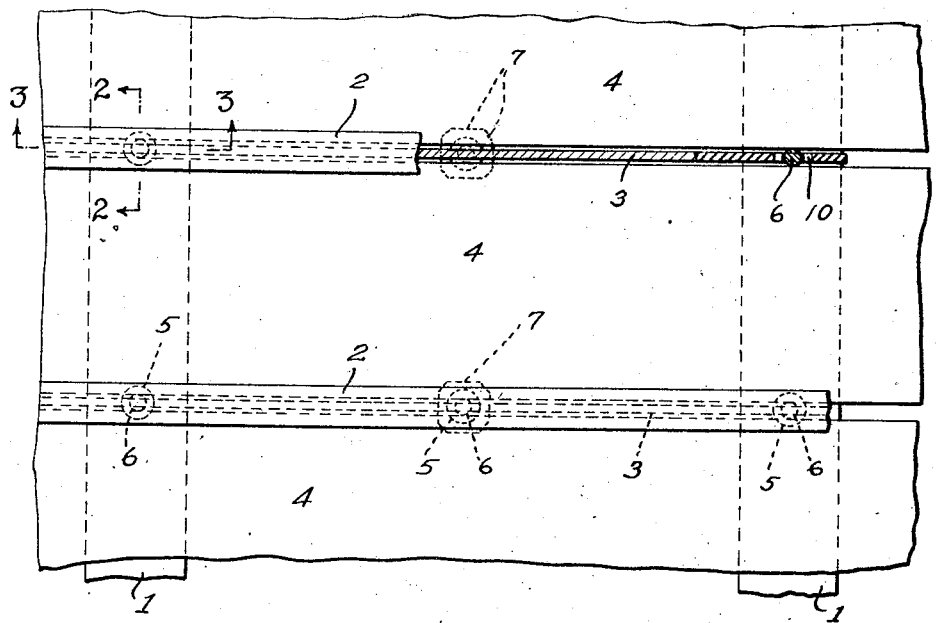
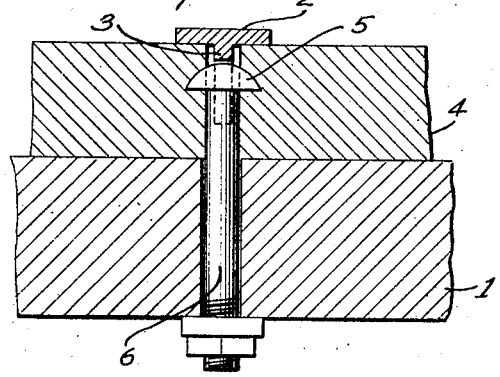
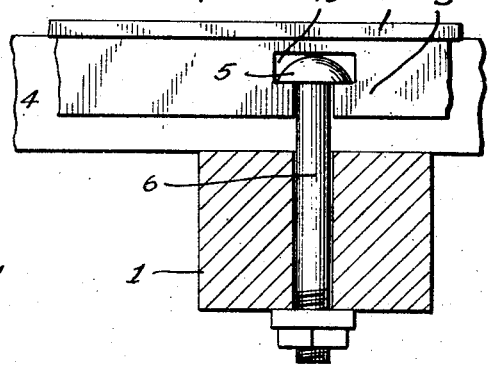
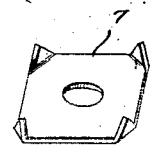
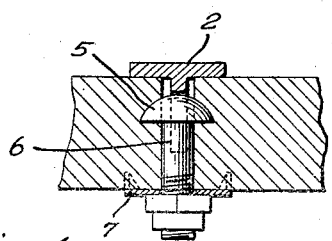
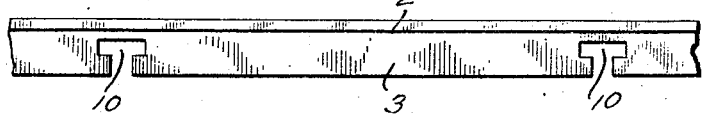
INVENTOR
WILLIAM J. BARR.
BY
*E. F. Murdock*
ATTORNEY Patented June 8, 1926.

1,588,000

UNITED STATES PATENT OFFICE.

WILLIAM J. BARR, OF NEWPORT NEWS, VIRGINIA.

AUTOMOBILE TRUCK-BODY CONSTRUCTION.

Application filed March 28, 1924. Serial No. 702,536.

Among the principal objects which the present invention has in view are: to provide a suitable construction of sliding strip for automobile truck bodies; and to provide an improved method and means for locking the same in position.

Drawings.

Figure 1 is a plan view, partly in section of a portion of a truck floor, showing the sliding strips in operative position;

Figure 2 is a sectional view taken on the line 2—2 of Figure 1;

Figure 3 is a sectional view taken on the line 3—3 of Figure 1;

Figure 4 is a perspective view of one of my improved sliding rails;

Figure 5 is a transverse sectional view of a sliding strip and floor boards, showing the use of a locking washer, and Figure 6 is a perspective view of the locking washer.

Description.

Heretofore longitudinally extending sliding strips have been used on the floors of trucks, to more readily move heavy objects from one end of the body to the other, and it is my object to provide a novel construction of sliding strip, and means of locking the same in place, which is being incorporated in this application.

Practically all truck bodies or frames are provided with course rails, and I have indicated the said course rails in my improvement by the spaced rails 1.

Substantially T-shape sliding strips are provided with transverse portions 2 and web portions 3. These strips are placed longitudinally of the truck body in such a manner that the under surfaces of the portions 2 engage and rest on the adjacent upper surfaces of the floor planks 4, while the web portions of the strips extend between the adjacent edges of the planks 4. I provide T-shape cut-out notches 10 in the web portions 3 of the strips, which are adapted to receive the heads 5 and shanks 6 of the fastening bolts, which extend through suitable openings in the floor boards and through the spaced course rails 1, as best illustrated in Figures 2, 3, and 5.

If it is desired, locking washers 7 may be placed over the lower ends of the bolts, to engage and lock in the under surfaces of the floor boards, were no course rails used.

From the foregoing description, it will be apparent, that the construction of the sliding rails and notched sockets, will provide a highly effective means of securing the several parts of a truck body together, and will provide for the ready renewal of the parts when necessary.

Many minor changes in detail of construction may be resorted to without departure from the spirit of the invention.

Claims.

1. A truck body construction including course rails, floor boards supported thereon, T-shaped sliding rails disposed between said floor boards, said sliding rails being notched through their web portions, and means adapted to extend through said course rails into said notches to positively hold the several parts in position.

2. A truck body construction including course rails, floor boards supported thereon, T-shaped sliding rails disposed between said floor boards, said sliding rails being provided with a plurality of T-shaped notched-out sockets, said sockets being formed through the webs of said sliding rails, and bolts adapted to fit in said sockets and extend through said floor boards and course rails to hold the several parts in locked position.

3. The combination with a truck body having floor boards arranged with spaces therebetween, of substantially T-shaped sliding rails adapted to be positioned with their webs extending between the floor boards and with their heads extending above the floor boards, said rails having transversely disposed edge opening T-shaped slots in the webs thereof, fastening bolts disposed with their heads in the head portions of the web slots and with their shanks extending through the edge opening portions of said slots, and body securing means carried by the ends of said bolts.

WILLIAM J. BARR.